United States Patent
Turnbull et al.

(10) Patent No.: US 9,647,519 B2
(45) Date of Patent: May 9, 2017

(54) INFLATABLE AIR GAP TOOLING FOR ASSEMBLY OF ROTOR AND STATOR

(71) Applicant: GM Global Technology Operations LLC, Detroit, MI (US)

(72) Inventors: Paul F. Turnbull, Canton, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 299 days.

(21) Appl. No.: 14/291,545

(22) Filed: May 30, 2014

(65) Prior Publication Data

US 2015/0349614 A1    Dec. 3, 2015

(51) Int. Cl.
*H02K 15/16* (2006.01)

(52) U.S. Cl.
CPC ........ *H02K 15/16* (2013.01); *Y10T 29/49014* (2015.01); *Y10T 29/53143* (2015.01)

(58) Field of Classification Search
CPC .............. H02K 15/16; Y10T 29/49014; Y10T 29/53143
See application file for complete search history.

(56) References Cited

U.S. PATENT DOCUMENTS

| 4,196,506 A * | 4/1980 | Reed ................. | B23Q 3/15773 414/730 |
| 4,384,397 A * | 5/1983 | Nelson ............... | B23Q 3/15773 414/736 |
| 4,505,031 A * | 3/1985 | Colwell ............... | H02K 5/1677 29/596 |
| 5,716,310 A * | 2/1998 | Polacek ............. | B23Q 3/15526 483/51 |
| 2015/0349614 A1* | 12/2015 | Turnbull ............... | H02K 15/16 29/598 |

FOREIGN PATENT DOCUMENTS

DE    19845683 A1    4/2000

OTHER PUBLICATIONS

German Office Action dated Dec. 5, 2016; Application No. 10 2015 107 636.5 Applicant: GM Global Technology Operations LLC; 5 pages.

* cited by examiner

*Primary Examiner* — Minh Trinh
(74) *Attorney, Agent, or Firm* — BrooksGroup

(57) ABSTRACT

A number of variations may include a method of assembly of a rotor and a stator having a concentric air gap in an electric motor comprising: providing inflatable gap support tooling in a deflated state in an air gap between a rotor and a stator; filling the inflatable gap support tooling with a fluid so that it uniformly fills at least a portion of the air gap between the stator and the rotor and holds the stator and the rotor together as a single unit; placing the single unit into a motor assembly; seating a plurality of bearings into the motor assembly; locking the stator into place in the motor assembly; removing the fluid from the inflatable gap support tooling; and removing the inflatable gap support tooling from the motor assembly.

13 Claims, 3 Drawing Sheets

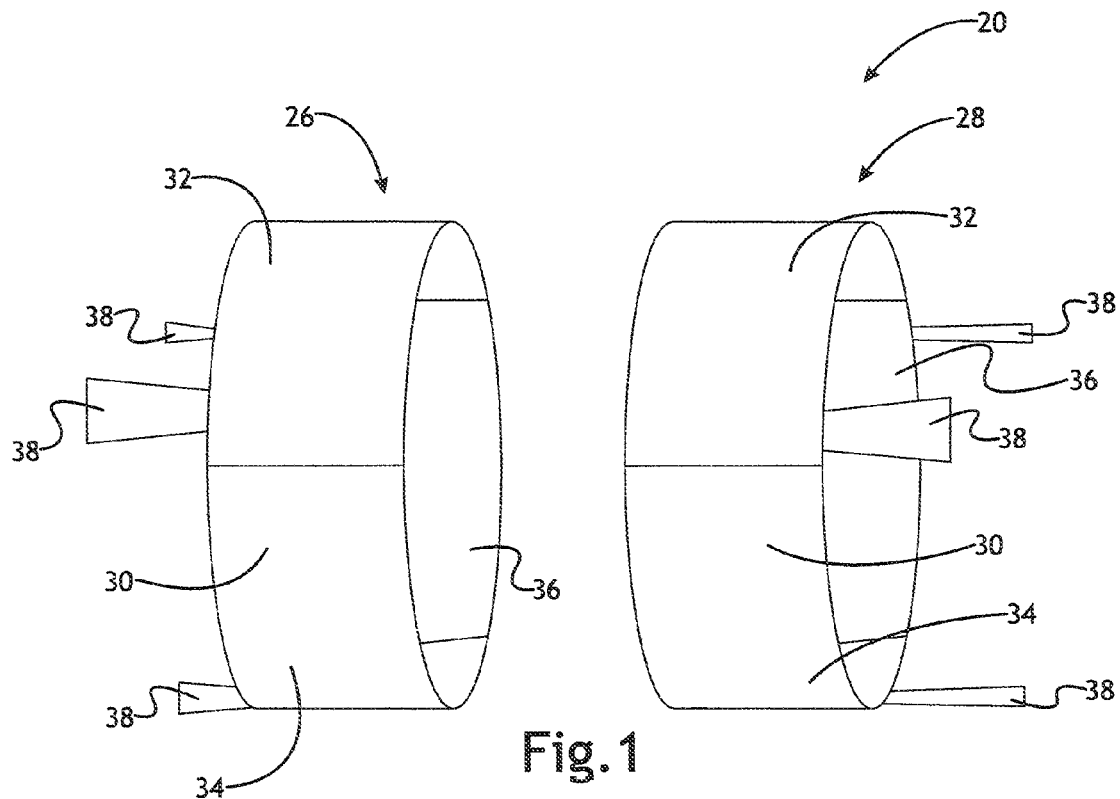
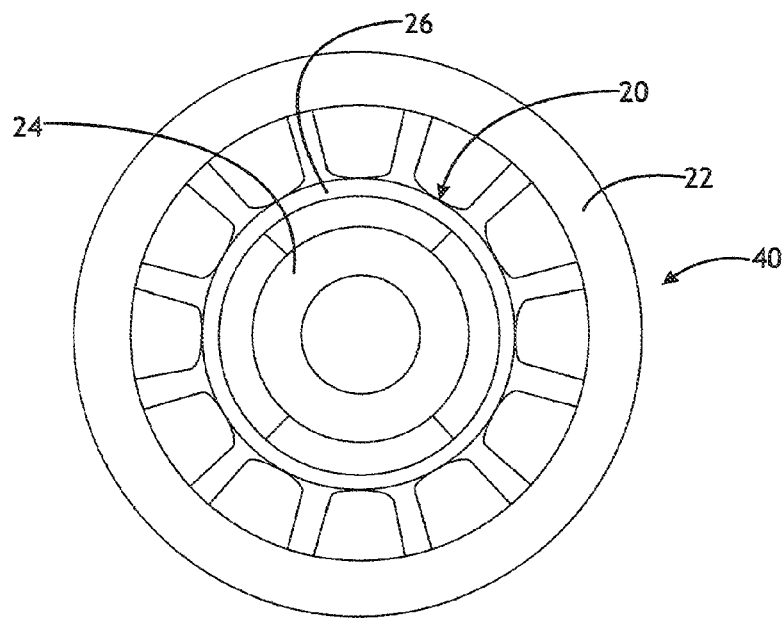

INFLATABLE AIR GAP TOOLING FOR ASSEMBLY OF ROTOR AND STATOR

TECHNICAL FIELD

The field to which the disclosure generally relates to includes electric motors.

BACKGROUND

An electric motor may include a rotor and a stator.

SUMMARY OF ILLUSTRATIVE VARIATIONS

One variation may include a product comprising: a gap support tool comprising: an inflatable body portion, wherein the inflatable body portion comprises a plurality of fluid chambers, and wherein the plurality of fluid chambers are constructed and arranged to center a rotor inside a stator and create a concentric air gap between the stator and the rotor during assembly.

Another variation may include a method comprising assembly of a rotor and a stator having a concentric air gap in an electric motor comprising providing inflatable gap support tooling in a deflated state between a rotor and a stator; filling the inflatable gap support tooling with a fluid so that it uniformly fills at least a portion of the air gap between the stator and the rotor and so the stator and the rotor are held together as a single unit; placing the single unit into a motor assembly; seating a plurality of bearings in a motor assembly to establish the rotor centerline position; locking the stator into place in the motor assembly; removing the fluid from the inflatable gap support tooling; and removing the inflatable gap support tooling from the motor assembly.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 1 illustrates gap support tooling according to a number of variations.

FIG. 2 illustrates gap support tooling positioned between a rotor and a stator according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 3:
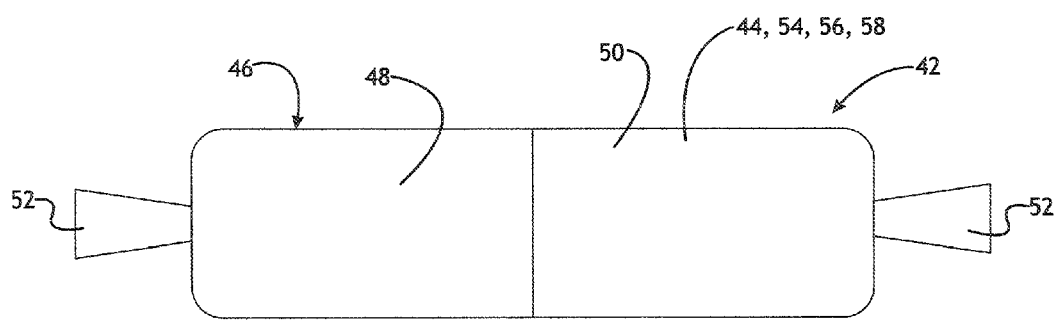
FIG. 3 illustrates a gap support tool according to a number of variations.

Referring to FIGS. 1, 2, and 3, in a number of variations, a product may comprise gap support tooling 20, 42. Gap support tooling 20, 42 may be used to provide concentric stator 22 location about the rotor 24 so that there may be a concentric air gap between the stator 22 and the rotor 24. A concentric air gap may improve the drive performance of any number of motors including, but not limited to, an electric motor. A concentric air gap may also reduce warranty issues of the motor and may reduce noise coming from the motor.

Referring to FIGS. 1 and 2, in a number of variations, gap support tooling 20 may comprise a first inflatable hollow cylinder 26 and a second inflatable hollow cylinder 28. The first inflatable hollow cylinder 26 and second inflatable hollow cylinder 28 may each comprise a body portion 30. The body portion 30 may comprise a plurality of fluid chambers 32, 34, 36 which may form the hollow cylinder. In one variation, the body portion 30 may include a first fluid chamber 32, a second fluid chamber 34, and a third fluid chamber 36. The first, second, and third fluid chambers 32, 34, 36 may each be equal in size. In another variation, the first, second, and third fluid chambers 32, 34, 36, may each be of different sizes. Each fluid chamber 32, 34, 36 may also include a nozzle 38 which may extend from an outer perimeter of the fluid chamber 32, 34, 36 and may be constructed and arranged to allow fluid to enter into the fluid chamber 32, 34, 36, and may retain the fluid inside the fluid chamber 32, 34, 36 until an operator releases the fluid from the fluid chamber 32, 34, 36. The first and second inflatable hollow cylinders 26, 28 may each be constructed and arranged so that they may contact at least a portion of the inner circumference of the stator 22 and at least a portion of the outer circumference of the rotor 24, for example as illustrated in FIG. 2. The first and second inflatable hollow cylinders 26, 28 may also be constructed and arranged so that in an inflated state they may hold the rotor 24 and the stator 22 together and maintain a concentric air gap between the rotor 24 and the stator 22, as will be discussed hereafter. The first and second inflatable hollow cylinders 26, 28 may comprise any number of materials including, but not limited to, an elastomeric material.

During assembly of a motor, in a number of variations, the first inflatable hollow cylinder 26 may be inserted from a first side of the rotor 24 and the stator 22 into the air gap between the rotor 24 and the stator 22 in a deflated state and the second inflatable hollow cylinder 28 may be inserted from a second side of the rotor 24 and the stator 22 into the air gap between the rotor 24 and the stator 22 in a deflated state so that they may meet approximately in the center of the thickness of the circumference of the rotor 24 and the stator 22. In another variation, only a first inflatable hollow cylinder 26 may be used, which may extend from a first side of the rotor 24 and the stator 22 into the air gap between the rotor 24 and the stator 22 past the center of the thickness of the circumference of the rotor 24 and the stator 22. Each of the first, second, and third fluid chambers 32, 34, 36 in each of the first and second inflatable hollow cylinders 26, 28 may then be filled with a fluid, including, but not limited to, an incompressible fluid, for example but not limited to, an oil or other liquid. If the fluid chambers 32, 34, and 36 are equal in size, then they may each be filled with equal volumes of fluid so that they all reach the same thickness which may hold the rotor 24 centered on the stator 22 and may overcome a magnetic attraction of the rotor 24 to the stator 22, if present. If the fluid chambers 32, 34, and 36 are of different sizes, then they each may be filled with volumes of fluid proportional to their sizes, so that they all reach the same thickness. The pressure of the first and second inflatable hollow cylinders 26, 28 may close at least a substantial portion of the air gap between the rotor 24 and the stator 22 and may hold the rotor 24 to the stator 22 so that the rotor 24 and the stator 22 may become a single assembly 40. The rotor and stator assembly 40 may then be placed into a motor housing (not illustrated). The stator 22 may be bolted into place and the rotor bearings (not illustrated) may be fully seated. The fluid from the first and second inflatable hollow cylinders 26, 28 may then be removed from the first, second, and third fluid chambers 32, 34, 36 through the nozzles 38. Once the first and second inflatable hollow cylinders 26, 28 are deflated, they may be removed from the motor assembly and may leave a uniform air gap between the rotor 24 and the stator 22.

Figure 4:
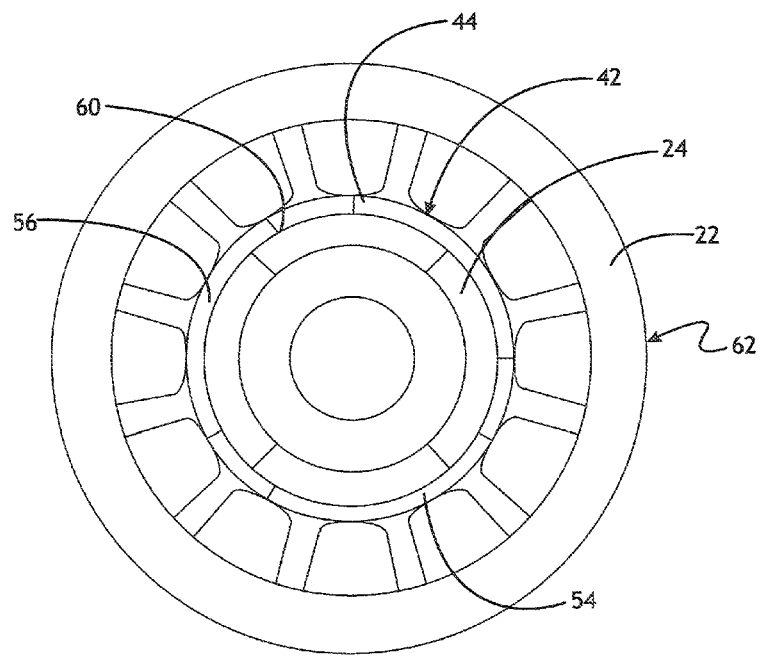
FIG. 4 illustrates gap support tooling positioned between a rotor and a stator according to a number of variations.
Figure 5:
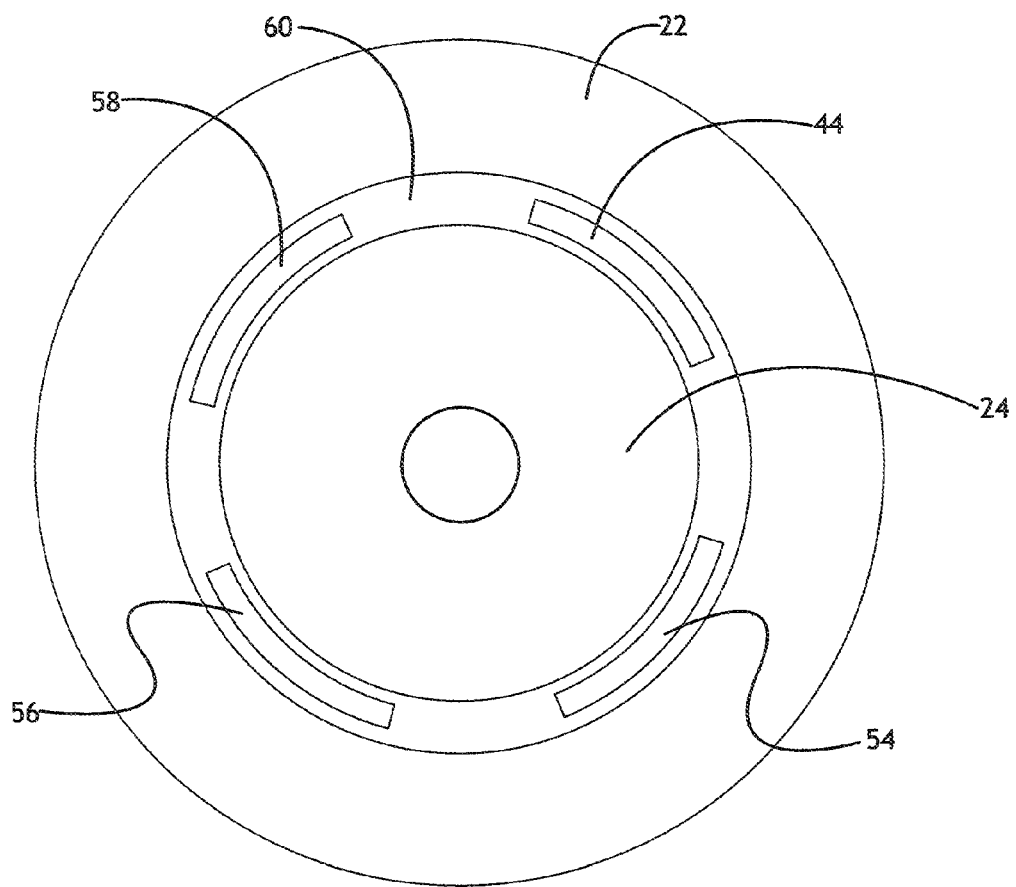
FIG. 5 illustrates gap support tooling positioned between a rotor and a stator according to a number of variations.

Referring to FIGS. 3-5, in another variation, axial gap support tooling 42 may comprise a plurality of axial inflatable shims 44, 54, 56, 58. An axial inflatable shim 44, 54, 56, 58 may include a body portion 46 which may include a first and second fluid chamber 48, 50 and which may be constructed and arranged to maintain a concentric air gap between the rotor 24 and the stator 22, as will be discussed hereafter. In another variation, an axial inflatable shim 44, 54, 56, 58 may include only a single fluid chamber (not illustrated). The first and second fluid chambers 48, 50 may be equal in size. Each fluid chamber 48, 50 may include a nozzle 52 which may be located at each end of the body portion 46 and may be constructed and arranged to allow fluid to enter into the fluid chambers 48, 50. The nozzles 52 may also retain the fluid inside the fluid chambers 48, 50 at a desired pressure until an operator releases the fluid from the fluid chambers 48, 50. The axial inflatable shims 44, 54, 56, 58 may comprise any number of materials including but not limited to, an elastomeric material.

During assembly of the motor, in a number of variations, the axial shims 44, 54, 56, 58 may be provided within the air gap 60 between the rotor 24 and the stator 22 in a deflated state. In one variation, a first, second, and third axial shim 44, 54, 56 may be provided in the air gap 60 between the rotor 24 and the stator 22, for example as illustrated in FIG. 4. In another variation, a first, second, third, and fourth axial shim 44, 54, 56, 58 may be inserted into the air gap 60 between the rotor 24 and the stator 22, for example as illustrated in FIG. 5. Each axial shim 44, 54, 56, 58 may be approximately equally spaced apart from each other inside the air gap 60. Each axial shim 44, 54, 56, 58 may extend through the air gap 60 between the rotor 24 and the stator 22 so that they are approximately centered within the width of the inner circumference of the stator 22 and the outer circumference of the rotor 24. Each of the first and second fluid chambers 48, 50 may then be filled with equal volumes of fluid including, but not limited to, an incompressible fluid, so that they may hold the rotor 24 centered onto the stator 22 and may overcome the magnetic attraction of the rotor 24 to the stator 22. The pressure of the fluid in the axial shims 44, 54, 56, 58 may close at least a substantial portion of the air gap 60 between the rotor 24 and the stator 22 and may hold the rotor 24 and the stator 22 together so that the rotor 24 and the stator 22 become a single assembly 62, for example as illustrated in FIG. 4. The rotor and stator assembly 62 may then be placed into a motor housing (not illustrated). The rotor bearings (not illustrated) may be fully seated establishing the rotor centerline position and then the stator 22 may be bolted into place. The fluid from the axial shims 44, 54, 56, 58 may then be removed from the first and second fluid chambers 48, 50 through the nozzles 52. Once the axial shims 44, 54, 56, 58 are deflated, they may be removed from the motor assembly and may leave a uniform air gap 60 between the rotor 24 and the stator 22.

In a number of variations, the use of gap support tooling 20, 42 may result in a uniform concentric air gap 60 between the rotor 24 and the stator 22 without requiring tight tolerances on the motor components. The use of the air gap tooling 20, 42 may also eliminate the use of traditional incompressible shims which may be difficult to remove after assembly of the stator 22 into the motor housing. The uniform concentric gap between the rotor 24 and the stator 22 may also reduce warranty issues with the motor assembly, reduce noise coming from the motor assembly, and/or may improve the performance of the motor assembly.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a gap support tool comprising: an inflatable body portion, wherein the inflatable body portion comprises a plurality of fluid chambers, and wherein the plurality of fluid chambers are constructed and arranged to center a rotor inside a stator and create a concentric air gap between the stator and the rotor during assembly.

Variation 2 may include a product as set forth in Variation 1 wherein the inflatable body portion has a hollow cylindrical shape and is constructed and arranged to fit between at least a portion of an inner circumference of the stator and an outer circumference of the rotor.

Variation 3 may include a product as set forth in any of Variations 1-2 wherein each of the plurality of fluid chambers includes a nozzle, and wherein the nozzles are constructed and arranged to allow fluid to enter into the plurality of fluid chambers, retain the fluid inside the plurality of fluid chambers, and release the fluid from the plurality of fluid chambers.

Variation 4 may include a product as set forth in Variation 1 wherein the inflatable body portion comprises a shim, wherein the shim comprises a first and a second fluid chamber, and wherein the first and the second fluid chambers each comprise a nozzle.

Variation 5 may include a product as set forth in any of Variations 1 and 4 wherein the nozzles are constructed and arranged to allow the fluid to enter into the first and the second fluid chambers, retain the fluid inside the first and the second fluid chambers, and release the fluid from the first and the second fluid chambers.

Variation 6 may include a method comprising: assembly of a rotor and a stator having a concentric air gap in an electric motor comprising: providing inflatable gap support tooling in a deflated state in an air gap between a rotor and a stator; filling the inflatable gap support tooling with a fluid so that it uniformly fills at least a portion of the air gap between the stator and the rotor and holds the stator and the rotor together as a single unit; placing the single unit into a motor assembly; seating a plurality of bearings into a motor assembly establishing the rotor centerline position; locking the stator into place in the motor assembly; removing the fluid from the inflatable gap support tooling; and removing the inflatable gap support tooling from the motor assembly.

Variation 7 may include a method as set forth in Variation 6 wherein the inflatable gap support tooling creates a uniform concentric air gap between the rotor and the stator after assembly.

Variation 8 may include a method as set forth in any of Variations 6-7 wherein the inflatable gap support tooling comprises a first hollow cylinder and a second hollow cylinder, wherein the first and second hollow cylinders each comprise a first, a second, and a third fluid chamber, and wherein the first, the second, and the third fluid chambers are each equal in size and each include a nozzle which is constructed and arranged to receive the fluid and remove the fluid from the fluid chambers.

Variation 9 may include a method as set forth in any of Variations 6-8 wherein the inflatable gap support tooling includes a plurality of shims, wherein the shims each include a body portion, wherein the body portion comprises a first fluid chamber and a second fluid chamber, and wherein each of the first and the second fluid chambers include a nozzle which is constructed and arranged to receive the fluid and remove the fluid from the fluid chambers.

Variation 10 may include a method comprising: assembling an electric motor so that the rotor and a stator have a concentric uniform air gap comprising: providing at least one inflatable gap support tool comprising a plurality of fluid chambers; assembling the stator over the rotor with the at least one inflatable gap support tool in a deflated state positioned between the stator and the rotor; inflating the at least one inflatable gap support tool with a fluid so that the at least one inflatable gap support tool fills at least a portion of an air gap between the stator and the rotor and causes the stator and the rotor to become concentric and held together; loading the stator, the rotor, and the at least one inflatable gap support tool into a motor housing; seating a plurality of bearings into a motor housing establishing the rotor centerline position; attaching the stator to the motor housing; deflating the at least one inflatable gap support tool; and removing the at least one inflatable gap support tool from the motor housing.

Variation 11 may include a method as set forth in Variation 10 wherein the at least one inflatable gap support tool comprises a first and a second hollow cylinder, wherein the first and the second hollow cylinders each comprise a first, a second, and a third fluid chamber, and wherein the first and the second hollow cylinders are constructed and arranged to contact at least a portion of an inner circumference of the stator and an outer circumference of the rotor.

Variation 12 may include a method as set forth in any of Variations 10-11 wherein the first, the second, and the third fluid chambers are equal in size.

Variation 13 may include a method as set forth in any of Variations 10-12 wherein each of the first, the second, and the third fluid chambers include a nozzle.

Variation 14 may include a method as set forth in any of Variations 10-13 wherein each of the nozzles are constructed and arranged to receive the fluid, retain the fluid, and remove the fluid from the fluid chambers.

Variation 15 may include a method as set forth in Variation 10 wherein the at least one inflatable gap support tool comprises a plurality of shims, wherein the plurality of shims each include a first and a second fluid chamber, and wherein the plurality of shims are equally spaced along an inner circumference of the stator and an outer circumference of the rotor.

Variation 16 may include a method as set forth in any of Variations 10 and 15 wherein the first and second fluid chambers are equal in size.

Variation 17 may include a method as set forth in any of Variations 10 and 15-16 wherein each of the first and the second fluid chambers include a nozzle.

Variation 18 may include a method as set forth in any of Variations 10 and 15-17 wherein each of the nozzles are constructed and arranged to receive the fluid, retain the fluid, and remove the fluid from the fluid chambers.

The above description of select variations within the scope of the invention is merely illustrative in nature and, thus, variations or variants thereof are not to be regarded as a departure from the spirit and scope of the invention.

What is claimed is:

1. A method comprising:
   assembly of a rotor and a stator having a concentric air gap in an electric motor comprising:
   providing inflatable gap support tooling in a deflated state in an air gap between a rotor and a stator;
   filling the inflatable gap support tooling with a fluid so that it uniformly fills at least a portion of the air gap between the stator and the rotor and holds the stator and the rotor together as a single unit;
   placing the single unit into a motor assembly;
   seating a plurality of bearings into the motor assembly;
   locking the stator into place in the motor assembly;
   removing the fluid from the inflatable gap support tooling; and
   removing the inflatable gap support tooling from the motor assembly.

2. The method of claim 1 wherein the inflatable gap support tooling creates a uniform concentric air gap between the rotor and the stator after assembly.

3. The method of claim 1 wherein the inflatable gap support tooling comprises a first hollow cylinder and a second hollow cylinder, wherein the first and second hollow cylinders each comprise a first, a second, and a third fluid chamber, and wherein the first, the second, and the third fluid chambers are each equal in size and each include a nozzle which is constructed and arranged to receive the fluid and remove the fluid from the fluid chambers.

4. The method of claim 1 wherein the inflatable gap support tooling includes a plurality of shims, wherein the plurality of shims each include a body portion, wherein the body portion comprises a first fluid chamber and a second fluid chamber, and wherein each of the first and the second fluid chambers include a nozzle which is constructed and arranged to receive the fluid and remove the fluid from the fluid chambers.

5. A method comprising:
   assembling an electric motor so that the rotor and a stator have a concentric uniform air gap comprising:
   providing at least one inflatable gap support tool comprising a plurality of fluid chambers;
   assembling the stator over the rotor with the at least one inflatable gap support tool in a deflated state positioned between the stator and the rotor;
   inflating the at least one inflatable gap support tool with a fluid so that the at least one inflatable gap support tool fills at least a portion of an air gap between the stator and the rotor and causes the stator and the rotor to become concentric and held together;
   loading the stator, the rotor, and the at least one inflatable gap support tool into a motor housing;
   seating a plurality of bearings to the motor housing;
   attaching the stator to the motor housing;
   deflating the at least one inflatable gap support tool; and
   removing the at least one inflatable gap support tool from the motor housing.

6. The method of claim 5 wherein the at least one inflatable gap support tool comprises a first and a second hollow cylinder, wherein the first and the second hollow cylinders each comprise a first, a second, and a third fluid chamber, and wherein the first and the second hollow cylinders are constructed and arranged to contact at least a portion of an inner circumference of the stator and an outer circumference of the rotor.

7. The method of claim 6 wherein the first, the second, and the third fluid chambers are equal in size.

8. The method of claim 6 wherein each of the first, the second, and the third fluid chambers include a nozzle.

9. The method of claim 8 wherein each of the nozzles are constructed and arranged to receive the fluid, retain the fluid, and remove the fluid from the fluid chambers.

10. The method of claim 5 wherein the at least one inflatable gap support tool comprises a plurality of shims, wherein the plurality of shims each include a first and a second fluid chamber, and wherein the plurality of shims are equally spaced along an inner circumference of the stator and an outer circumference of the rotor.

11. The method of claim 10 wherein the first and second fluid chambers are equal in size.

12. The method of claim 10 wherein each of the first and the second fluid chambers include a nozzle.

13. The method of claim 12 wherein each of the nozzles are constructed and arranged to receive the fluid, retain the fluid, and remove the fluid from the fluid chambers.

* * * * *